(12) United States Patent
Blumschein et al.

(10) Patent No.: US 9,496,704 B2
(45) Date of Patent: Nov. 15, 2016

(54) METHOD AND PROTECTIVE DEVICE FOR DETECTING A SYMMETRICAL SHORT-CIRCUIT IN A MULTIPHASE ELECTRICAL POWER SUPPLY NETWORK

(75) Inventors: Joerg Blumschein, Berlin (DE); Michael Claus, Nuremberg (DE); Volker Henn, Erlangen (DE); Matthias Kereit, Berlin (DE); Gustav Steynberg, Igensdorf (DE); Yilmaz Yelgin, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 569 days.

(21) Appl. No.: 14/116,006

(22) PCT Filed: May 6, 2011

(86) PCT No.: PCT/EP2011/057287
§ 371 (c)(1),
(2), (4) Date: Nov. 6, 2013

(87) PCT Pub. No.: WO2012/152304
PCT Pub. Date: Nov. 15, 2012

(65) Prior Publication Data
US 2014/0071565 A1 Mar. 13, 2014

(51) Int. Cl.
*H02H 3/00* (2006.01)
*H02H 3/16* (2006.01)
(Continued)

(52) U.S. Cl.
CPC .............. *H02H 3/162* (2013.01); *H02H 1/04* (2013.01); *H02H 7/26* (2013.01); *H02H 3/05* (2013.01); *H02H 3/40* (2013.01); *H02H 7/30* (2013.01)

(58) Field of Classification Search
USPC ........................................................ 361/67
See application file for complete search history.

(56) References Cited

U.S. PATENT DOCUMENTS 4,342,064 A * 7/1982 Wilkinson ............. H02H 3/382
361/80
4,366,474 A * 12/1982 Loewenstein .......... G01R 27/16
340/651
(Continued)

FOREIGN PATENT DOCUMENTS

DE 4100646 A1 9/1992
WO 2010006632 A1 1/2010

OTHER PUBLICATIONS

Siemens AG, Manual "SIPROTEC Distance Protection 7SA6, V4.70", Release 2011, Order No. C53000-G1176-C156-7, chapter 2.3: Power swing detection (optional), DE (Non-patent-literature file No. 2013Q19683).
(Continued)

*Primary Examiner* — Stephen W Jackson
(74) *Attorney, Agent, or Firm* — Laurence Greenberg; Werner Stemer; Ralph Locher (57) ABSTRACT

A first protective device monitors a first section of a power supply network for a symmetrical short-circuit and a second protective device monitors a second section for a symmetrical short-circuit. The second protective device is a reserve protective device, which emits a shut-off command to a power switch after a time lag when a symmetrical short-circuit in the first section is recognized. An oscillation recognition unit emits an oscillating signal which blocks the shutoff command if an oscillation in the power supply network has been recognized. External symmetrical short-circuits can be disconnected independently of an occurring oscillation, when the second protective device has recognized a symmetrical short-circuit in the first section, before the oscillation recognition unit recognizes an oscillation in the power supply network, the shut-off command is emitted independently of the presence of an oscillating signal if the lag time has elapsed.

6 Claims, 4 Drawing Sheets

(51) Int. Cl.
  *H02H 1/04*   (2006.01)
  *H02H 7/26*   (2006.01)
  *H02H 3/05*   (2006.01)
  *H02H 3/40*   (2006.01)
  *H02H 7/30*   (2006.01)

(56) References Cited

U.S. PATENT DOCUMENTS 7,511,385 B2 * 3/2009 Jones ............... H02M 5/4585
                                                    290/43
8,451,570 B2 * 5/2013 Yelgin ................ H02H 1/04
                                                    361/80
2011/0163777 A1   7/2011 Yelgin

OTHER PUBLICATIONS

Moore P J et al: "New method of power swing blocking for digital distance protection", IEEE Proceedings: Generation, Transmission and Distribution, Institution of Electrical Engineers, GB, vol. 143, No. 1, Jan. 30, 1996, pp. 19-26, XP006006437, ISSN: 1350-2360, 001: 10.1 049/IP-GTD:19960055; Jan. 30, 1996.

* cited by examiner

METHOD AND PROTECTIVE DEVICE FOR DETECTING A SYMMETRICAL SHORT-CIRCUIT IN A MULTIPHASE ELECTRICAL POWER SUPPLY NETWORK

BACKGROUND OF THE INVENTION

Field of the Invention

The invention relates to a method for detecting a symmetrical short-circuit in a multiphase electrical power supply network, wherein a first section of the power supply network is monitored for a symmetrical short-circuit by means of a first protective device and a second section of the power supply network is monitored for a symmetrical short-circuit by means of a second protective device. In this arrangement the second protective device is configured for the purpose of additionally monitoring the first section of the power supply network for a symmetrical short-circuit as a standby protective device while executing a distance protection function and, if a symmetrical short-circuit is detected in the first section, of issuing a shutoff command to a circuit breaker after a predefined grading time has elapsed. Also provided is an oscillation detection device which monitors the power supply network for the presence of an electrical oscillation and emits an oscillation signal blocking the issuing of the shutoff command by the second protective device if an oscillation has been detected in the power supply network. The invention also relates to an electrical protective device for monitoring an electrical power supply network.

Typically, electrical power supply networks are monitored section by section for unacceptable operating states, such as short-circuits or ground faults for example, by means of protective devices. If such an unacceptable operating state occurs, the protective devices isolate the part of the power supply network affected by the fault from the rest of the network by opening corresponding circuit breakers and in this way avoid exposing people and components of the electrical power supply network to risk. In order to monitor the individual sections of the electrical power supply network, the protective devices execute what are known as protection algorithms. In this case use is made of measured values, which for example may be measured values characterizing the current and the voltage at a measurement point of the electrical power supply network, in order to reach a decision as to whether an unacceptable or an acceptable operating state is present.

A protection algorithm frequently used in this connection operates according to what is known as the distance protection method, in which impedance values lying in a complex number plane are calculated from measured current and voltage values and a check is carried out to determine whether the impedance values lie within a predefined range, also referred to as a tripping polygon. If the impedance values lie within said predefined range, the distance protection device identifies an unacceptable operating state in the section of the electrical power supply network monitored by it and sends a tripping signal to one or more circuit breakers delimiting the section in order to isolate the fault-affected section from the rest of the power supply network. In this case the distance protection algorithm distinguishes between internal faults, so called because they relate to the section of the power supply network directly monitored by the distance protection device, and external faults which are located outside of said section and fall within the immediate area of responsibility of another protective device. Whereas a distance protection device must instantly initiate a disconnection of its fault-affected section in the case of internal faults, it normally serves as standby protection in the case of external faults. If another protective device that is responsible for the external fault does not isolate the fault within a predefined grading time, the distance protection device acting as standby protection initiates a disconnection after said time interval has elapsed. A plurality of grading times of different length can also be provided in the distance protection device acting as standby protection.

Abrupt changes in load or changes to the structure of the electrical power supply network (due to major parts of the network being connected or disconnected, for example) can result in what are termed oscillation events network or power swings (which shall be referred to hereinbelow for the sake of simplicity as "oscillations") in the electrical power supply network owing to the fact that the generators at the infeed points of the electrical power supply network must adjust to the new load situation. This typically happens in the form of a damped oscillation until the new operating point of the electrical power supply network has stabilized. During an oscillation, current and voltage swing back and forth, as it were, between high and low values along the power supply lines. For this reason it can often happen during an oscillation that an electrical distance protection device measures low voltages with simultaneously high currents at its measurement point and from this calculates low impedance values that lie within a tripping polygon. However, since a damped—also referred to as synchronous—oscillation normally describes a non-hazardous operating state of the electrical power supply network, no tripping should occur in such a case. If just the distance protection function were used, however, the distance protection device would detect an unacceptable operating state and disconnect the monitored section of the electrical power supply network. This can result in unwanted erroneous shutdowns of certain parts of the electrical power supply network, such shutdowns generally being associated with high costs for the operator of the electrical power supply network. Moreover, the abruptly changing network structure due to the erroneous shutdown can result in sections of the electrical power supply network that are still activated being overloaded, which can lead to cascading shutdowns and ultimately to a total blackout.

So-called power swing or oscillation detection devices are usually provided in order to avoid unwanted erroneous tripping when oscillations occur. When an oscillation detection device detects an oscillation, it emits an oscillation signal. Said oscillation signal can be used for example to block the emission of a tripping signal to an electrical circuit breaker by a distance protection device. In this case an oscillation detection device can either be an integral part of a protective device or form a separate entity that is operatively connected to a protective device.

Distance protection devices with integrated oscillation detection are marketed by the applicant under the name "SIPROTEC Distance Protection 7SA6", for example. The corresponding devices are known from the Siemens AG device manual "SIPROTEC Distance Protection 7SA6, V4.7", published in 2010 under Siemens AG order number C53000-G1100-C156-8. It is described in section 2.3 "Measures in the event of power swings" in said device manual that for power swing/oscillation detection purposes a curve profile formed by impedance values in a complex number plane is examined for characteristic properties such as e.g. "continuity", "monotonicity" and "erratic behavior", and on the basis of the examination results an oscillation signal is generated in the event of an oscillation being detected.

In the event of symmetrical short-circuits, which is to say short-circuits occurring simultaneously in all phases of the power supply network, oscillation detection devices can respond in error on account of the fact that the impedances measured during a symmetrical short-circuit move due to the rotor displacement angle changes of the generators. Depending on fault location, fault duration and infeed conditions, said impedance movements can be great. If the symmetrical short-circuit is located in the first section of the power supply network and in spite of this the first protective device does not trip (e.g. due to a defect), the generation of a disconnect command for the first section by the second protective device can be prevented due to the erroneous operation of the oscillation detection device.

BRIEF SUMMARY OF THE INVENTION

The object underlying the invention is to disclose a possible means by which external symmetrical short-circuits can be reliably detected and isolated irrespective of an occurring oscillation.

This object is achieved according to the invention by means of a method of the type cited in the introduction, wherein in the event on the one hand that a symmetrical short-circuit in the first section has been detected by the second protective device before an oscillation in the power supply network has been detected by the oscillation detection device, the shutoff command is issued irrespective of the presence of an oscillation signal if the grading time has elapsed, and in the event on the other hand that an oscillation has been detected by the oscillation detection device before a symmetrical short-circuit in the first section has been detected by the second protective device, the shutoff command is blocked by the pending oscillation signal.

An overfunctioning of the power swing/oscillation detection means during symmetrical short-circuits is effectively avoided by means of the method according to the invention. In this case the invention is based on the knowledge that a power swing/oscillation detection means will not operate immediately in the event of a short-circuit, since under stationary conditions the rotor displacement angle of the generator changes only after a certain inherent delay. Swing-like events in the power supply network are triggered only when there is a clear change in rotor displacement angle. Because the second protective device checks the order of the occurrence in time of the detection of the symmetrical short-circuit in the first section and the detection of an oscillation in the power supply network and reacts differently according to the detected order, a blocking of the standby protection function for the first section by a detected oscillation can be effectively prevented.

In actuality, the second protective device reacts in the following way: In the event that a symmetrical short-circuit is present, the standby protection function will be excited with minimum delay in all three phases. The currently formed protection zone excitation is stored. The corresponding grading time is started. If the impedance pointers move in a swing-like manner on account of the symmetrical short-circuit, a power swing/oscillation detection means will thereupon operate in all three phases. In this case the measuring element of the protection function is inhibited, i.e. the most recently formed zone excitation is effectively "frozen". The elapsing of the grading time remains unaffected. After the grading time has elapsed, the standby protection for the first section will generate a shutoff command tripping the circuit breaker and the short-circuit will be isolated.

In the event that a symmetrical oscillation is present, the power swing/oscillation detection means will excite before the standby protection. At the time of the first excitation of the measuring element of the second protective device will be blocked by the pending oscillation signal. No shutoff command is issued and consequently no circuit breaker is tripped either.

According to an advantageous embodiment variant of the method according to the invention, it is provided that the elapsing of the grading time will be aborted if the second protective device detects a termination of the symmetrical short-circuit.

By this means it is possible to prevent a disconnection by the second protective device if the short-circuit has been resolved in some other way, e.g. by the first protective device. This is in particular of advantage because the second protective device normally does not open that circuit breaker which is located in immediate proximity to the symmetrical short-circuit, but rather causes the circuit breaker assigned to the second protective device to open, as a result of which a major part of the power supply network is electrically isolated.

Another advantageous embodiment variant of the method provides that in order to detect a symmetrical short-circuit in the first section the second protective device records current pointer and voltage pointer measured values for each phase at a measurement point assigned to the second section, forms impedance pointer values for each phase from the current pointer measured values and the associated voltage pointer measured values and checks their position in a complex impedance diagram, there being provided in the impedance diagram a tripping polygon that has a main protection zone and at least one standby protection zone to which the grading time is assigned. In this case the second protective device detects a symmetrical short-circuit in the first section if the impedance pointer values of each phase lie in the at least one standby protection zone.

In this way a decision about an external fault that has occurred in the first section can be taken very easily on the basis of the position of the impedance values in the tripping polygon.

In this connection it can furthermore be provided that at least two standby protection zones are provided to which grading times of different length are assigned, and in the event that a symmetrical short-circuit in the first section has been detected by the second protective device before an oscillation in the power supply network has been detected by the oscillation detection device, in order to issue the shutoff command for the first section that grading time is used which is assigned to the standby protection zone in which the impedance pointer values were located immediately prior to the detection of the oscillation.

This embodiment variant possesses the advantage that an oscillation in which the impedance values pass through a plurality of standby protection zones does not have a retroactive effect on the grading time. Rather, in order to form the disconnect command use is made of that grading time which is assigned to the standby protection zone in which the impedance values currently lay prior to the power swing/oscillation detection.

The above-cited object is also achieved by means of a protective device for monitoring an electrical power supply network having a measured value acquisition device for acquiring current pointer and voltage pointer measured values and a control device which is configured for detecting symmetrical short-circuits in the power supply network on the basis of the acquired current pointer and voltage pointer measured values. It is provided according to the invention that the control device is configured for performing a method as claimed.

With regard to the protective device it can furthermore be provided that the oscillation detection device is part of the protective device.

The invention is explained in more detail below with reference to exemplary embodiments taken in conjunction with the drawings, in which:

DESCRIPTION OF THE INVENTION

Figure 1:
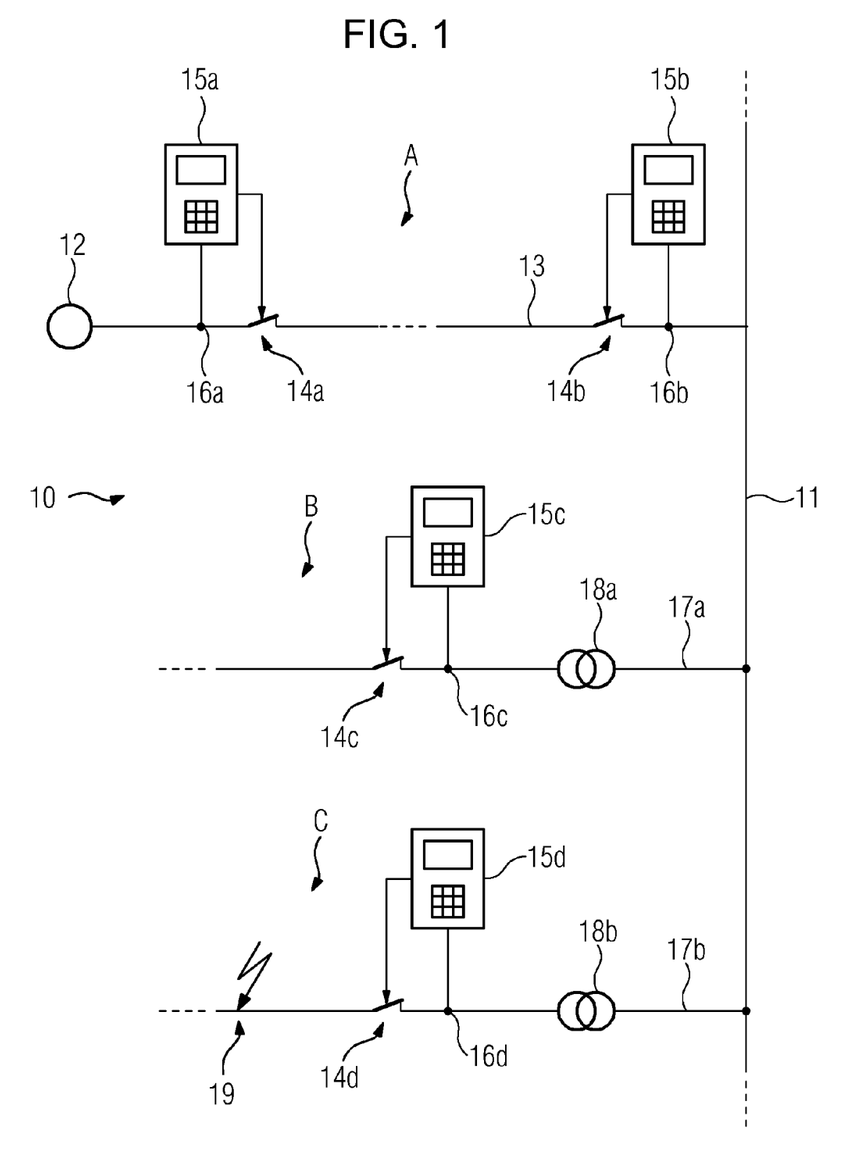
FIG. 1 shows a schematic diagram representing a section of an electrical power supply network.

FIG. 1 shows by way of example a part 10 of a three-phase electrical power supply network that is not represented in further detail hereinafter. The part 10 of the electrical power supply network is fed with electrical energy by means of a generator 12. Located between the generator 12 and a busbar 11 is a schematically indicated three-phase power transmission line 13, designated as section A. The power transmission line 13 is provided with circuit breakers 14a and 14b by means of which the section A in the form of the power transmission line 13 can be isolated from the remaining section of the part 10 of the electrical power supply network.

Protective devices 15a and 15b, which can be e.g. so-called distance protection devices, are provided in order to monitor the section A for possibly occurring faults such as short-circuits, for example. The protective devices 15a and 15b record measured values, e.g. in the form of current and voltage measured values, at measurement points 16a and 16b and on the basis of said measured values reach a decision about an acceptable or an unacceptable operating state on the section A. The mode of operation of a distance protection device has already been explained in more detail in the introduction and therefore shall not be dealt with in depth again at this juncture.

If one of the protective devices 15a or 15b or both have detected an unacceptable operating state on their assigned section A, i.e. the power transmission line 13, a shutoff command is issued to the respective circuit breaker 14a or 14b in order to separate the fault-affected section A from the remaining part 10 of the electrical power supply network. In this connection a fault signal can also be sent to the opposite end of the fault-affected power transmission line 13 in order to induce the protective device located there to generate a corresponding shutoff command for its circuit breaker as well. In the case of a fault occurring on the section A monitored directly by the respective protective device 15a or 15b, this, as already mentioned in the introduction, is also referred to as an "internal" fault.

A section B and a section C of the power supply network are also connected to the busbar 11 in the form of two branches 17a and 17b. With regard to the first branch 17a, a first transformer 18a, a medium-voltage transformer for example, transforms the voltage present on the busbar 11 down to a corresponding level (a medium-voltage level, for example). An analogous transformation is carried out in respect of the second branch 17b by way of a second transformer 18b.

The sections B and C in the form of the branches 17a and 17b can be separated from the busbar 11 by way of further circuit breakers 14c and 14d in the event of a fault. For that purpose further protective devices 15c and 15d are provided; these can also be distance protection devices (but also other protective devices, e.g. overcurrent protection devices). These record measured values at measurement points 16c and 16d and decide on the basis of said measured values whether an acceptable or an unacceptable operating state is present on the branches 17a and 17b respectively.

In the case of FIG. 1, a symmetrical short-circuit, i.e. a short-circuit affecting all three phases, is supposed to have occurred by way of example at a fault location 19 designated by a lightning symbol on the section C of the power supply network (branch 17b). The protective device 15d directly responsible for said section C should detect said symmetrical short-circuit and cause the circuit breaker 14d assigned to it to break its switching contacts in order to isolate the branch 17b from the busbar 11 and thereby prevent the fault having a detrimental effect on the remaining part 10 of the electrical power supply network.

However, in the event that the fault at the fault location 19 were not to be detected by the protective device 15d responsible, due for example to a malfunction of the protective device 15d, the protective device 15a (and possibly also the protective device 15b) is configured as a standby protective device. It detects the external (from its perspective) short-circuit and, after a predefined grading time has elapsed within which the protective device 15d is given the opportunity to respond to the fault at the fault location 19, sends a tripping signal to its circuit breaker 14a in order in this way to isolate the fault at the location 19. This, however, also electrically deenergizes the sections A and B in addition to the fault-affected section C, for which reason a direct isolation of the fault by the protective device actually responsible (in this case protective device 15d) is always preferred.

If the protective device 15b were also to be configured as a standby protective device, in the example illustrated in FIG. 1 it would detect the short-circuit at location 19 as a fault in the reverse direction. From the perspective of the protective device 15a, on the other hand, the short-circuit manifests itself as a fault in the forward direction. The protective devices 15a and 15b perceive the fault that has occurred at the location 19 as an external fault because the latter is not located in the protection zone directly assigned to them, in this case section A (power transmission line 13).

The reliable detection and isolation of external faults on the part 10 of the electrical power supply network can be made more difficult by an oscillation in the electrical power supply network that has been caused by the symmetrical short-circuit. Such an oscillation is caused by a short-circuit-induced change in the rotor displacement angle of the generator 12.

Since, as mentioned in the introduction, an oscillation should normally not lead to an unwanted tripping of a circuit breaker, distance protection devices are generally equipped with so-called oscillation detection devices which detect oscillations with the aid of per se known algorithms, e.g. on the basis of a speed at which the impedance values move on a path curve in an R-X diagram which will be explained in more detail later. When an oscillation has been detected by an oscillation detection device, it generates what is termed an oscillation signal which blocks the issuing of a shutoff command by the protective device.

However, in the event that a symmetrical short-circuit is actually present on a remote section (section C in FIG. 1) and is to be isolated by the standby protection function of the protective device after the grading time has elapsed, a blocking of the shutoff command is not desirable and can lead to a propagation of the fault, which in this case has not been isolated. The protective device 15b must consequently possess a standby protection function which is able to discriminate between an oscillation in the fault-free case and a symmetrical short-circuit which resulted in an oscillation.

An exemplary embodiment of a method by means of which such a distinction can be made shall be explained in more detail with reference to the logic diagram shown in FIG. 2. The logic makes use of the effect that due to the inherent delay of the rotor of the generator an oscillation caused by a symmetrical short-circuit always occurs with a certain time delay with respect to the short-circuit itself. For the following example it is to be assumed that the protective device 15a is configured as a standby protective device for the protective device 15d. The evaluation algorithm shown in the logic diagram is implemented as a standby protection function in device software of the protective device 15a.

For this purpose a measuring element 21 of a control device (not shown explicitly) of the protective device 15a performs a distance protection function which, as explained in more detail hereinabove, carries out a check at the measurement point 16a for a short-circuit that has occurred on the basis of current and voltage pointer measured values acquired by means of a measured value acquisition device (not shown) of the protective device 15a and impedance pointer measured values calculated therefrom for each phase L1, L2, L3. If a short-circuit is detected for a phase L1, L2, L3, the distance protection function is excited for said phase and an excitation signal is generated for the respective phase L1, L2, L3 by distance protection blocks 22a, 22b, 22c of the measuring element 21. The excitation signals of the distance protection blocks 22a, 22b, 22c are supplied on the one hand to respective inputs of a first AND element 23a and on the other hand to respective inverted inputs of a second AND element 23b.

An oscillation detection device 24 implemented in the device software of the protective device 15a performs power swing/oscillation detection for each phase L1, L2, L3 on the basis of the calculated impedance pointer values. In the event of an oscillation being detected, phase-selective oscillation detection blocks 25a, 25b, 25c generate oscillation excitation signals for the respective phase L1, L2, L3, which signals are supplied on the one hand by way of inverted inputs to a downstream third AND element 23c and on the other hand to a likewise downstream fourth AND element 23d.

Connected to the first and the third AND element 23a and 23c on the output side is a fifth AND element 23e, to the output of which the control input S ("Set") of a flip-flop 26 is connected in turn. A rest input R ("Reset") of the flip-flop 26 is connected to the output of the second AND element 23b.

The flip-flop 26 is connected for its part by means of its output Q to a first signal output 27 and a sixth AND element 23f (an inverted output $\overline{Q}$ of the flip-flop 26 remains unassigned). A further input of the sixth AND element 23f is connected to the output of the fourth AND element 23d. Finally, the sixth AND element 23f is connected on the output side to a second signal output 28.

The mode of operation of the logic shown in FIG. 2 shall be explained in more detail with reference to the exemplary cases shown in FIGS. 3 and 4 of an external symmetrical short-circuit that is present (fault location 19 in FIG. 1) and an oscillation taking place in the absence of a fault.

Figure 3:
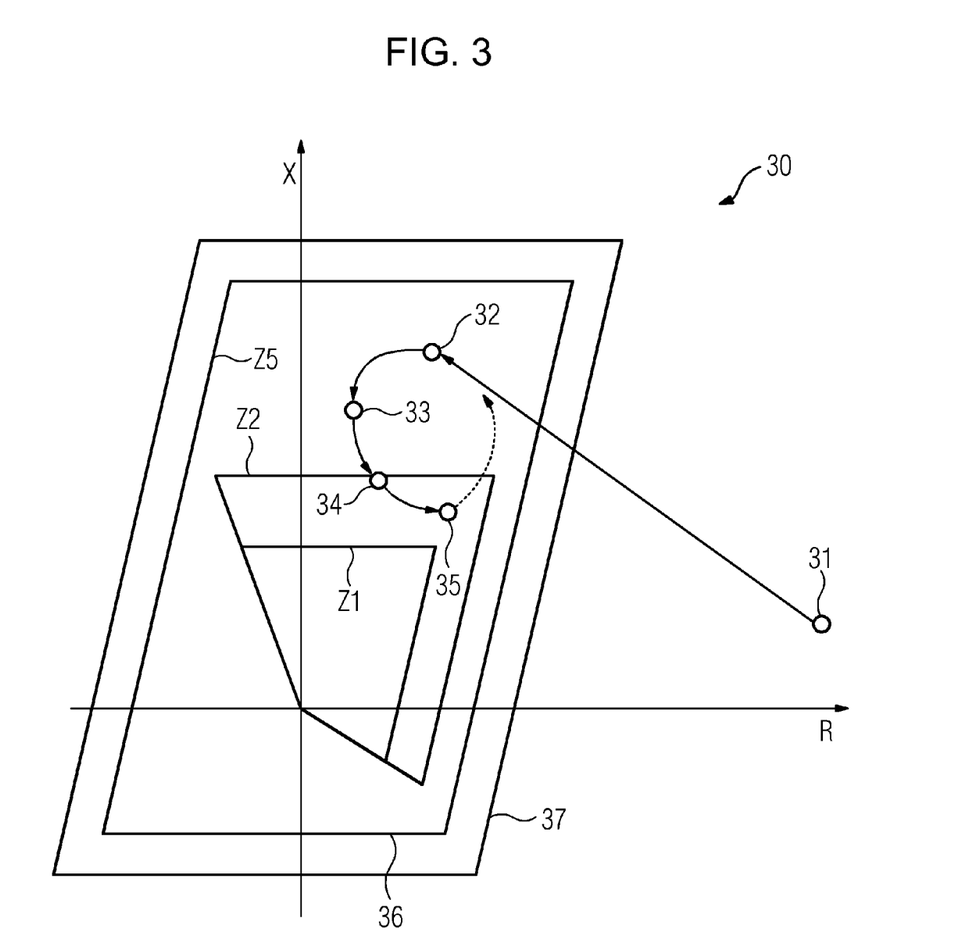
FIG. 3 shows a first R-X diagram intended to illustrate in exemplary fashion the mode of operation in the event of a symmetrical short-circuit.

For this purpose a so-called R-X diagram 30 is shown in FIG. 3. In an R-X diagram, impedance values are represented in the complex impedance plane, which is to say in the form of what are termed complex numbers having real and imaginary parts. Whereas the real part of the impedance is shown on the axis designated by "R", this also being referred to as the so-called resistance part and indicating the ohmic resistance portion of the impedance, the imaginary part of the impedance is shown on the axis designated by "X", which is also referred as the so-called reactance and indicates the inductive and/or capacitive part of the impedance values.

Each impedance value is determined by means of current and voltage measured values recorded at a respective measurement point, in the present example the measurement point 16a in FIG. 1, which values are typically current and voltage pointer measured values containing amplitude and phase angle. The respective impedance values are likewise represented by amplitude and phase angle in the form of what is termed an impedance pointer (the terms "impedance value" and "impedance pointer" are therefore used synonymously hereinbelow), which, starting from the point of origin of the R-X diagram, extends to the value representing the corresponding amplitude and corresponding phase angle. For clarity of illustration reasons, only the progression of the pointer peaks is shown in each case as a curve profile in the R-X diagram 30 in FIG. 3.

Shown within the R-X diagram 30 is a so-called tripping polygon 36, which indicates that region in the impedance plane which is typically assumed by impedance values during internal or external faults. The tripping polygon 36 comprises a plurality of protection zones, of which the main protection zone Z1 and the standby protection zones Z2 and Z5 are shown by way of example in FIG. 3. If the impedance values are located inside the tripping polygon 36, a shutoff command is usually generated in order to open the corresponding circuit breaker. In this case impedance values lying within the main protection zone Z1 result in an internal fault being inferred and the shutoff command is generated immediately. On the other hand, the standby protection zones Z2 and Z5, which serve for detecting external faults, are assigned grading times which specify a time delay with which the shutoff command is to be generated. This measure is intended to give that protective device (in this case protective device 15d) which is actually provided for isolating the external fault the opportunity to generate its own shutoff command before a major part of the power supply network is disconnected by means of the shutoff command of the standby protective device (in this case protective device 15a). Typically, the grading times increase as standby protection zones increase in size, i.e. the grading time of the standby protection zone Z5 is greater than that of the standby protection zone Z2.

The tripping polygon 36 is surrounded by a so-called power swing polygon 37. Starting from the time the impedance values enter the power swing polygon, an oscillation signal blocking a shutoff command can be generated if an oscillation is detected.

FIG. 3 shows by way of example an impedance characteristic of the fault loops of all three phases L1, L2, L3 during a symmetrical short-circuit at the fault location 19 (see FIG. 1). At position 31 all the impedances initially lie in the load range. When the short-circuit occurs, all the impedances jump to the short-circuit impedance in zone Z5 (position 32). The distance protection blocks 22a, 22b, 22c (cf. FIG. 2) of all three phases excite accordingly, with the result that the grading time T5 assigned to the standby protection zone Z5 is started. The excitation signals of the distance protection blocks 22a, 22b, 22c are transmitted to the first and second AND elements 23a and 23b. The first AND element 23a emits a signal on the output side if an excitation signal is present for all three phases L1, L2, L3, while because of the inverted inputs the second AND element 23b emits an output signal precisely when no excitation signal is present for any of the three phases L1, L2, L3. In the present case only the first AND element 23a consequently emits a signal to the fifth AND element 23e on the output side. Since at this time no oscillation has been detected by the oscillation detection blocks 25a, 25b, 25c, the third AND element 23c likewise emits a signal which is supplied to the further input of the fifth AND element 23e and accordingly causes the fifth AND element 23e to emit its own signal to the control output S of the flip-flop 26. On the output side the flip-flop 26 emits a signal which is supplied to the first signal output 27 and after the grading time T5 has elapsed causes a shutoff command to be output to the circuit breaker 14a.

Usually the short-circuit should now be isolated by way of the circuit breaker 14d by the protective device 15d responsible for the section C. In this example, however, this tripping does not take place, e.g. because the protective device 15d is defective.

On the other hand, if the symmetrical short-circuit were to be isolated by the protective device 15d actually responsible before the grading time T5 has elapsed, the distance protection blocks 22a, 22b, 22c would accordingly emit no more excitation signals, with the result that now, instead of the first AND element 23a, the second AND element 23b would emit a signal which would be supplied to the reset input R of the flip-flop 26. The flip-flop 26 would thereupon terminate the emission of the signal to the signal output 27 and no shutoff command would be issued.

However, because no isolation of the fault actually takes place, all the loop impedances now begin to move. At position 33 in the path curve profile, an oscillation is detected in all three phases L1, L2, L3 by the oscillation detection blocks 25a, 25b, 25c, e.g. since the impedance speeds on the path curve described point to an oscillation. Instead of the third AND element 23c, the fourth AND element 23d therefore now emits an output signal. In spite of the therewith terminating excitation of its control input S, the flip-flop 26 remains in its most recent state and continues to emit the signal to the signal output 27 on the output side. Owing to the signal now also present at the further input of the sixth AND element 23f as a result of the signal emission of the fourth AND element 23d, the sixth AND element 23f emits a signal to the signal output 28, as a result of which the most recent excitation of the distance protection blocks 22a, 22b, 22c of the measuring element 21 is effectively "frozen", i.e. no new excitation (e.g. using a different grading time) is formed. The already elapsed interval of the grading time T5 is not reset.

A short time later, all the impedance pointers are located in the standby protection zone Z2 at position 34 of the path curve. However, since the measuring element 21 persists in its most recent state ("is frozen"), no new zone excitation is formed and consequently the grading time T2 assigned to the standby protection zone is also not started.

After the grading time T5 has elapsed (position 35 of the path curve) all the impedance pointers are still located in the standby protection zone Z2. A shutoff command is now correctly issued even though an oscillation has been detected. The short-circuit is thus isolated.

Figure 4:
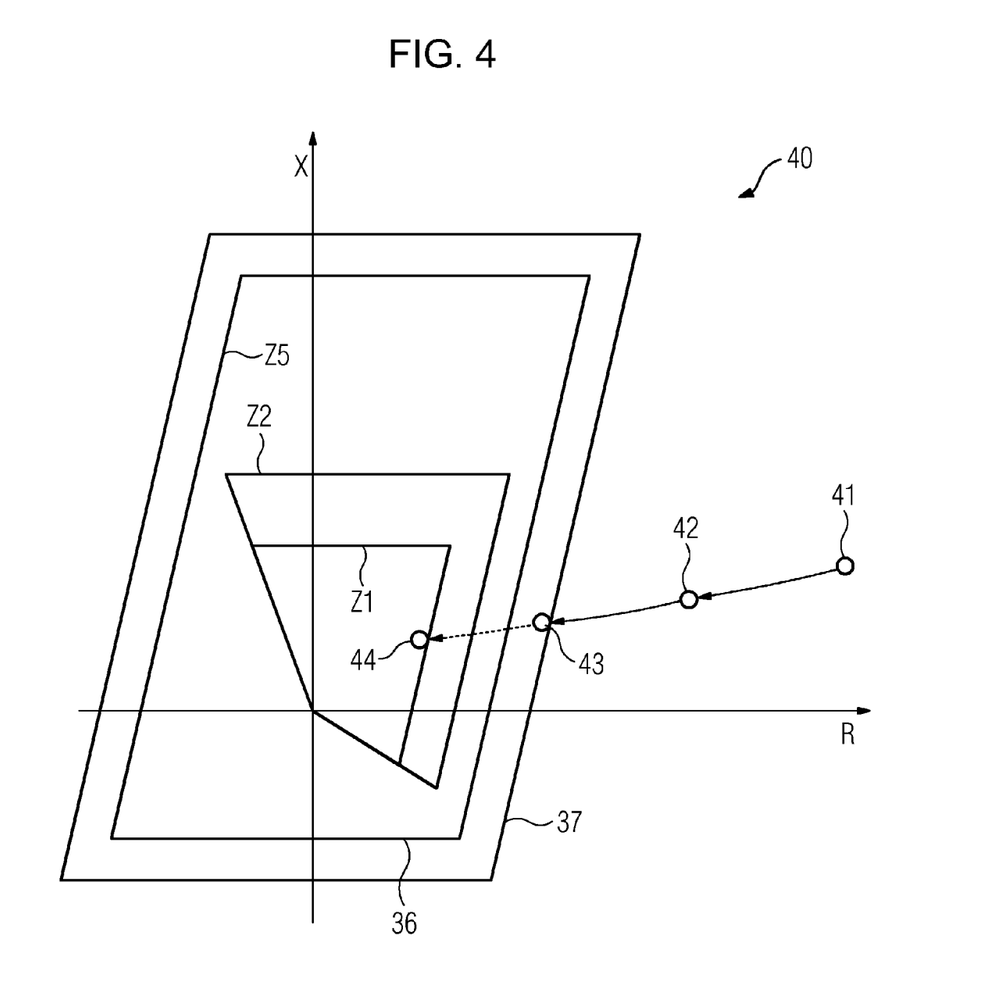
FIG. 4 shows a second R-X diagram intended to illustrate in exemplary fashion the mode of operation in the event of an oscillation.

FIG. 4 shows by way of example in an R-X diagram 40 an impedance characteristic of all of the phases L1, L2, L3 during a symmetrical oscillation without a symmetrical short-circuit being present. The layout of the R-X diagram 40 shown in FIG. 4 corresponds to the layout of the R-X diagram 30 from FIG. 3, for which reason like features have been labeled with the same reference signs.

At position 41 of the path curve all of the impedance pointers are initially located in the load range. At the start of the oscillation all of the impedance pointers will move, with the result that the oscillation is detected at position 42 of the path curve and the oscillation detection blocks 25a, 25b, 25c accordingly emit signals on the output side to the fourth AND element 23d, which emits a signal in its turn. At this time no symmetrical short-circuit is detected by the distance protection blocks 22a, 22b, 22c.

Figure 2:
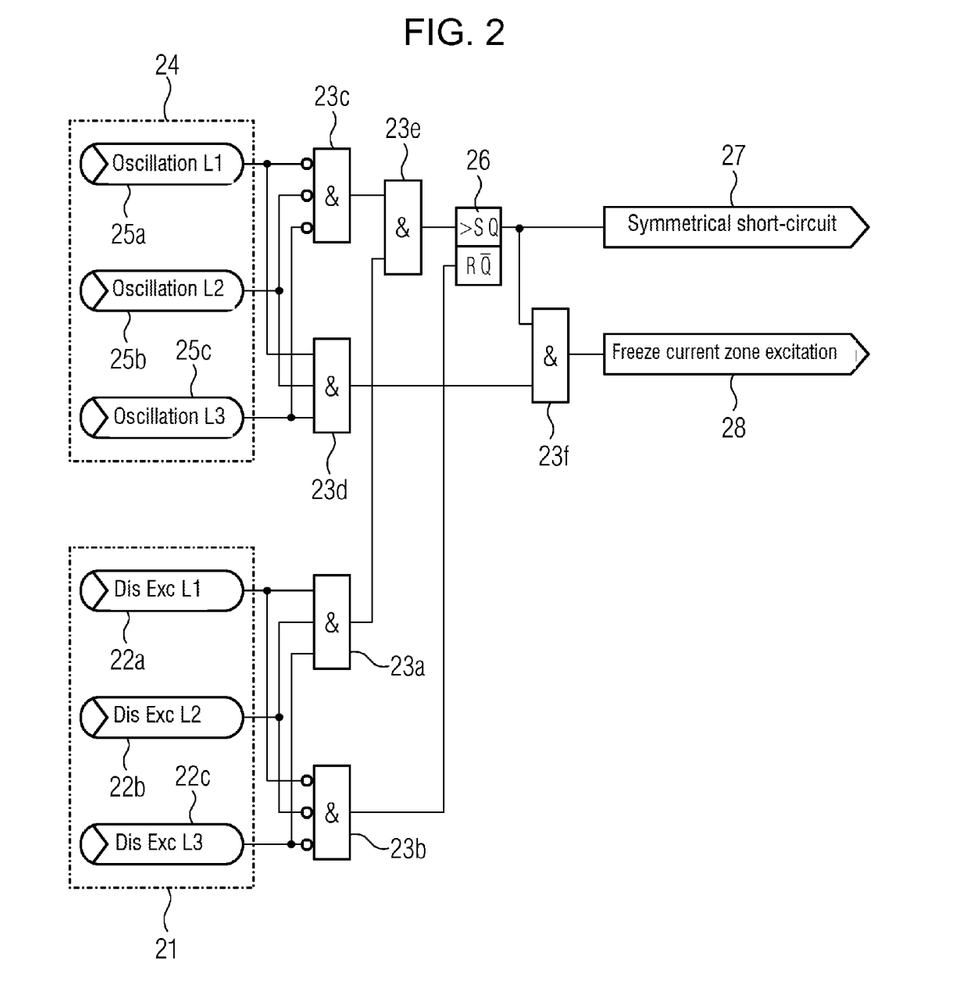
FIG. 2 shows a schematic logic diagram intended to illustrate an embodiment variant of the method according to the invention.

After a certain time the impedance pointers enter the power swing polygon 37 at position 43 of the path curve, as a result of which an oscillation signal is emitted (not shown in the logic diagram in FIG. 2). The measuring element of the distance protection function is disabled by the pending oscillation signal, with the result that no shutoff command can be issued. Even if the impedances run through the distance protection zones Z1, Z2, Z5 from position 43 to position 44 of the path curve, no grading time is started. Even in the event of detection, an excitation of the flip-flop 26 is prevented by the third and fifth AND elements 23c and 23f which are not switched through as long as the oscillation is present. As a consequence a shutoff command does not take place during the oscillation event.

To sum up, the standby protection function of the protective device 15a detects on the basis of the order of occurrence of an external symmetrical short-circuit or an oscillation whether a fault requiring to be resolved is present on the section C of the power supply network and reliably isolates same even in the event of an oscillation caused thereby. In the case of an oscillation that occurs without a fault, on the other hand, an unwanted tripping is blocked.

The invention claimed is:
1. A method of detecting a symmetrical short-circuit in a multiphase electrical power supply network, the method comprising:
monitoring a first section of the power supply network for a symmetrical short-circuit by way of a first protective device;
monitoring a second section of the power supply network for a symmetrical short-circuit by way of a second protective device;
additionally monitoring the first section of the power supply network for a symmetrical short-circuit with the second protective device configured as a standby protective device while executing a distance protection function and, if a symmetrical short-circuit is detected in the first section, issuing a shutoff command to a circuit breaker after a predefined grading time has elapsed; and
monitoring the power supply network for a presence of an electrical oscillation with an oscillation detection device and emitting an oscillation signal blocking the issuing of the shutoff command by the second protective device if an oscillation has been detected in the power supply network;

in the event that a symmetrical short-circuit in the first section has been detected by the second protective device before an oscillation in the power supply network has been detected by the oscillation detection device, issuing the shutoff command irrespective of the presence of an oscillation signal if the grading time has elapsed; and in the event that an oscillation has been detected by the oscillation detection device before a symmetrical short-circuit has been detected in the first section by the second protective device, blocking the shutoff command by the pending oscillation signal.

2. The method according to claim 1, which comprises aborting the elapsing of the grading time if the second protective device detects a termination of the symmetrical short-circuit.

3. The method according to claim 1, wherein:

in order to detect a symmetrical short-circuit in the first section, recording with the second protective device current pointer and voltage pointer measured values for each phase at a measurement point assigned to the second section;

with the second protective device, forming from the current pointer measured values and the associated voltage pointer measured values for each phase impedance pointer values and checking a position of the impedance pointer values in a complex impedance diagram, the impedance diagram having a tripping polygon formed with a main protection zone and at least one standby protection zone to which the grading time is assigned; and detecting with the second protective device a symmetrical short-circuit in the first section if the impedance pointer values of each phase lie in the at least one standby protection zone.

4. The method according to claim 3, providing at least two standby protection zones having grading times of different length assigned thereto; and in the event that a symmetrical short-circuit has been detected in the first section by the second protective device before an oscillation has been detected in the power supply network by the oscillation detection device, in order to issue a shutoff command for the first section, using the grading time that is assigned to the standby protection zone (e.g. Z5) in which the impedance pointer values lay immediately prior to a detection of the oscillation.

5. A protective device for monitoring an electrical power supply network, the protective device comprising:

a measured value acquisition device configured for acquiring current pointer and voltage pointer measured values;

a control device connected to said acquisition device and configured for detecting symmetrical short-circuits in the power supply network based on the current pointer and voltage pointer measured values acquired by said acquisition device;

wherein said control device is configured for performing the method according to claim 1.

6. The protective device according to claim 5, wherein the oscillation detection device forms a part of the protective device.

* * * * *